United States Patent
Ouyang et al.

(10) Patent No.: US 7,613,243 B2
(45) Date of Patent: *Nov. 3, 2009

(54) INTERLEAVER AND PARSER FOR OFDM MIMO SYSTEMS

(75) Inventors: Xuemei Ouyang, San Jose, CA (US); Huaning Niu, Santa Clara, CA (US); Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 561 days.

This patent is subject to a terminal disclaimer.

(21) Appl. No.: 11/104,808

(22) Filed: Apr. 12, 2005

(65) Prior Publication Data

US 2006/0227892 A1  Oct. 12, 2006

(51) Int. Cl.
*H04K 1/10* (2006.01)

(52) U.S. Cl. .......... 375/260; 375/267; 375/316; 375/286; 370/208; 714/752; 714/790; 341/81

(58) Field of Classification Search ........... 375/260, 375/267, 316, 286; 370/208; 714/752, 790; 341/81

See application file for complete search history.

(56) References Cited

U.S. PATENT DOCUMENTS

| | | | | |
|---|---|---|---|---|
| 4,394,642 | A * | 7/1983 | Currie et al. | 341/81 |
| 5,745,528 | A * | 4/1998 | Fimoff et al. | 375/316 |
| 5,987,070 | A * | 11/1999 | Fimoff et al. | 375/286 |
| 6,775,335 | B2 | 8/2004 | Sommer et al. | |
| 7,397,862 | B2 | 7/2008 | Ouyang et al. | |
| 2002/0131516 | A1 | 9/2002 | El-Gamal et al. | |
| 2003/0043928 | A1 | 3/2003 | Ling et al. | |
| 2003/0074625 | A1* | 4/2003 | Adar et al. | 714/752 |
| 2003/0103584 | A1 | 6/2003 | Bjerke et al. | |
| 2004/0059981 | A1* | 3/2004 | Cucchi et al. | 714/752 |
| 2005/0028065 | A1 | 2/2005 | Halter | |
| 2005/0078764 | A1 | 4/2005 | Gresset | |
| 2005/0220110 | A1 | 10/2005 | Agarwal | |
| 2005/0256821 | A1 | 11/2005 | Mishra et al. | |
| 2005/0265469 | A1 | 12/2005 | Aldana et al. | |
| 2005/0283705 | A1 | 12/2005 | McNamara | |
| 2006/0002486 | A1* | 1/2006 | van Nee | 375/260 |
| 2006/0013330 | A1 | 1/2006 | Ha | |
| 2006/0036924 | A1 | 2/2006 | Ghosh | |
| 2006/0088114 | A1 | 4/2006 | Chen et al. | |
| 2006/0088115 | A1 | 4/2006 | Chen et al. | |

(Continued)

OTHER PUBLICATIONS

S.A. Mujtaba, *TGn Sync Proposal Technical Specification*, doc. : IEEE 802.11-04/889r0, Aug. 2004, pp. 1-135.

(Continued)

*Primary Examiner*—Sudhanshu C Pathak
(74) *Attorney, Agent, or Firm*—Kenneth L. Sherman, Esq.; Michael Zarrabian, Esq.; Myers Andras Sherman LLP

(57) ABSTRACT

A MIMO wireless system includes a transmitter that has a transmitter having a parser that parses a bit stream into multiple spatial data streams and multiple interleavers corresponding to the multiple spatial data streams, where each interleaver interleaves the bits in the corresponding spatial data stream by performing multiple column rotation to increase diversity of the wireless system. The MIMO wireless system also includes a receiver that has deinterleavers that deinterleaves spatial bit streams transmitted by the transmitter.

25 Claims, 5 Drawing Sheets

U.S. PATENT DOCUMENTS

| | | | |
|---|---|---|---|
| 2006/0090120 A1* | 4/2006 | Chen | 714/790 |
| 2006/0107171 A1 | 5/2006 | Skraparlis | |
| 2006/0120311 A1 | 6/2006 | Berkovich | |
| 2006/0120469 A1* | 6/2006 | Maltsev et al. | 375/260 |
| 2006/0187815 A1 | 8/2006 | Wallace et al. | |
| 2006/0227892 A1 | 10/2006 | Ouyang et al. | |
| 2006/0274687 A1 | 12/2006 | Kim | |
| 2007/0067696 A1 | 3/2007 | Bhatt et al. | |
| 2007/0086538 A1* | 4/2007 | Ouyang et al. | 375/267 |
| 2007/0110178 A1 | 5/2007 | Su et al. | |
| 2007/0127587 A1* | 6/2007 | Ouyang et al. | 375/267 |
| 2007/0140100 A1 | 6/2007 | Ouyang et al. | |
| 2007/0140103 A1* | 6/2007 | Ouyang et al. | 370/208 |
| 2007/0140364 A1* | 6/2007 | Ouyang et al. | 375/260 |
| 2007/0147521 A1* | 6/2007 | Horng et al. | 375/260 |

OTHER PUBLICATIONS

Aziz, M.K.A. et al., A Study of performance and complexity for IEEE 802.11n MIMO-OFDM GIS solutions. In: Communications, 2004 IEEE International Conference on. New York: IEEE, 2004, vol. 7, pp. 3822-3826.

Mujtaba, S.A., "TGn Sync Proposal Technical Specification," doc.: IEEE 802.11 11-04/889r1, Nov. 2004, pp. 1-143.

Mujtaba, S.A., "TGn Sync Proposal Technical Specification," a contribution to IEEE 802.11 11-04-889r2, Jan. 2005, pp. 1-152.

Singh et al., "WWiSE proposal: High throughput extension to the 802.11 Standard," a contribution to IEEE 802.11 11-04-0886r4, Nov. 2004, pp. 1-80.

International Search Report for International Application No. PCT/KR2006/005555 from Korean Intellectual Property Office dated Mar. 20, 2007, 3 pgs.

Written Opinion of the International Searching Authority for International Application No. PCT/KR2006/005555 from Korean Intellectual Property Office dated Mar. 20, 2007, 4 pgs.

Kose et al., "WWiSE Proposal: High throughput extension to the 802.11 Standard," a contribution to doc: IEEE 802.11-05/0149r2, Mar. 2005, pp. 1-93.

Office Action for U.S. Appl. No. 11/292,851 (SAM2B.PAU.07) mailed on Mar. 31, 2009 by Examiner Gina M. McKie.

Office Action for U.S. Appl. No. 11/292,851 (SAM2B.PAU.07) mailed on Oct. 16, 2008 by Examiner Gina M. McKie.

Office Action for U.S. Appl. No. 11/314,929 (SAM2B.PAU.11) mailed on Apr. 3, 2009 by Examiner Kan Yuen.

Office Action for U.S. Appl. No. 11/314,929 (SAM2B.PAU.11) mailed on Oct. 10, 2008 by Examiner Kan Yuen.

Notice of Allowance for U.S. Appl. No. 11/253,855 (SAM2B.PAU.22) mailed on Mar. 4, 2008 by Examiner David Q. Nguyen.

Office Action for U.S. Appl. No. 11/314,925 (SAM2B.PAU.25) mailed on Apr. 13, 2009 by Examiner Kan Yuen.

Office Action for U.S. Appl. No. 11/314,925 (SAM2B.PAU.25) mailed on Oct. 15, 2008 by Examiner Kan Yuen.

Office Action for U.S. Appl. No. 11/317,409 (SAM2B.PAU.31) mailed on May 1, 2009 by Examiner Sung S. Ahn.

Office Action for U.S. Appl. No. 11/317,409 (SAM2B.PAU.31) mailed on Nov. 13, 2008 by Examiner Sung S. Ahn.

Mujtaba, S.A., "TGn Sync Proposal Technical Specification," a contribution to IEEE 802.11 11-04-889r7, Jul. 2005, pp. 1-133.

Naguib et al., "Increasing Data Rate over Wireless Channel" May 2000, Signal Processing Magazine, IEEE, pp. 76-92.

International Search Report for International Application No. PCT/KR2006/005133 from Korean Intellectual Property Office dated Feb. 26, 2007, 3 pgs.

Written Opinion of the International Searching Authority for International Application No. PCT/KR2006/005133 from Korean Intellectual Property Office dated Feb. 26, 2007, 3 pgs.

Mujtaba, S.A., "TGn Sync Proposal Technical Specification," a contribution to IEEE 802.11 11-04-889r44, Mar. 2005, pp. 1-162.

* cited by examiner

INTERLEAVER AND PARSER FOR OFDM MIMO SYSTEMS

FIELD OF THE INVENTION

The present invention relates generally to data communication, and more particularly, to data communication with transmission diversity using Orthogonal Frequency Division Multiplexing (OFDM) in multiple antenna channels.

BACKGROUND OF THE INVENTION

In wireless communication systems, antenna diversity plays an important role in increasing the system link robustness. OFDM is used as a modulation technique for transmitting digital data using radio frequency signals (RF). In OFDM, a radio signal is divided into multiple sub-signals that are transmitted simultaneously at different frequencies to a receiver. Each sub-signal travels within its own unique frequency range (sub-channel), which is modulated by the data. OFDM distributes the data over multiple channels, spaced apart at different frequencies.

OFDM modulation is typically performed using a transform such as Fast Fourier Transform (FFT) process wherein bits of data are encoded in the frequency-domain onto sub-channels. As such, in the transmitter, an Inverse FFT (IFFT) is performed on the set of frequency channels to generate a time-domain OFDM symbol for transmission over a communication channel. The IFFT process converts the frequency-domain phase and amplitude data for each sub-channel into a block of time-domain samples which are converted to an analogue modulating signal for an RF modulator. In the receiver, the OFDM signals are processed by performing an FFT process on each symbol to convert the time-domain data into frequency-domain data, and the data is then decoded by examining the phase and amplitude of the sub-channels. Therefore, at the receiver the reverse process of the transmitter is implemented Further, transmit antenna diversity schemes are used to improve the OFDM system reliability. Such transmit diversity schemes in OFDM systems are encoded in the frequency-domain as described.

OFDM has been selected as the basis for the high speed wireless local area network (WLAN) standards by the IEEE 802.11a standardization group, and is also being considered as the basis for the high throughput WLAN 802.11n. A typical transmitter for a conventional OFDM MIMO system implementing WLAN 802.11n comprises a channel encoder, a puncturer, a spatial parser, and multiple data stream processing paths. Each data stream processing path comprises an interleaver, a constellation mapper, an IFFT function, and guard-band insertion window and an RF modulator.

For parser and interleaver portion of the system, coded and punctured bits are interleaved across spatial streams and frequency tones. There are two steps to the space-frequency interleaving: spatial stream parsing and frequency interleaving. First, encoded and punctured bits are parsed to multiple spatial streams by a round-robin parser. The parser sends consecutive blocks of bits to different spatial streams in a round-robin fashion starting with the first spatial stream. Second, all encoded bits are interleaved by a separate block interleaver for each spatial stream, with a block size corresponding to the number of bits in a single OFDM symbol. The block interleavers are based on the 802.11a interleaver, with certain modifications to allow for multiple spatial streams and 40 MHz transmissions.

The interleaver is defined by a two-step permutation. The first permutation ensures that adjacent coded bits are mapped onto nonadjacent subcarriers. The second permutation ensures that coded bits are mapped alternately onto less and more significant bits of the constellation and thereby long runs of low reliability (LSB) bits are avoided. A deinterleaver in a receiver performs the inverse operation, and is also defined by two permutations corresponding to the two interleaver permutations.

In summary, the conventional system provides write in block, one column rotation for multiple antennas transmission, and PAM order rotation within a column. However, because the columns are rotated by only one column, adjacent bits only 3 and 6 sub-carriers apart for 20 MHz and 40 MHz systems, respectively. As a result, in a correlated channel, the diversity gain is not fully utilized.

BRIEF SUMMARY OF THE INVENTION

The present invention addresses the above shortcomings. In one embodiment the present invention provides a method of data communication in a wireless system, comprising the steps of: parsing a bit stream into multiple spatial data streams; interleaving the bits in each spatial data stream by performing multiple column rotation to increase diversity of the wireless system; and transmitting the bits of each spatial data stream. The steps of interleaving the bits in each spatial data stream further includes the steps of performing multiple column rotation to the largest possible distance within an interleaving array of that spatial data stream, to increase diversity of the wireless system.

The number of column rotations for each spatial data stream is a function of the number of the spatial data streams. Preferably, the number of column rotations for each spatial data stream is a function of the number of the spatial data streams and the number of bit columns in the interleaver array. In one version, each spatial data stream interleaver array includes $N_{row}$ rows and $N_{column}$ columns of bits, such that the number of column rotations for each spatial data stream is $((N_{column}/N_{ss}) \times i_{ss})$ column rotations, where $N_{ss}$ is the total number of spatial data streams and $i_{ss}$ is index of spatial data stream which ranges from e.g. 0 to $N_{ss}-1$.

In addition, the steps of interleaving the bits in each spatial data stream includes the steps of performing a first interleaving permutation to ensure that adjacent coded bits are mapped onto nonadjacent subcarriers for transmission, and a second interleaving permutation, such that the first interleaving permutation includes interleaving the bits in each spatial data stream by performing multiple column rotation to increase diversity of the wireless system.

According to another aspect of the present invention, the steps of parsing the bit stream further includes the steps of bitwise round robin parsing to increase spatial diversity. Further, the steps of parsing the bit stream further includes the steps of bitwise round robin parsing such that one bit of the bit stream is parsed to one data stream each time. Yet in accordance to another aspect of the present invention, the data communication method further includes the steps of puncturing each spatial data stream after the step of parsing. Preferably, the step of puncturing for each spatial data stream is based on the channel condition to optimize system performance.

The present invention further provides a wireless communication system implementing the method of the present invention, wherein in one embodiment the wireless communication system comprises: a transmitter including a parser that parses a bit stream into multiple spatial data streams; multiple interleavers corresponding to the multiple spatial data streams, wherein each interleaver interleaves the bits in the corresponding spatial data stream by performing multiple column rotation to increase diversity of the wireless system; and a modulator that transmits the bits of each spatial data stream. The system further includes a receiver that receives and deinterleaves the transmitted bits.

These and other features, aspects and advantages of the present invention will become understood with reference to the following description, appended claims and accompanying figures.

DETAILED DESCRIPTION OF THE INVENTION

In one embodiment, the present invention provides a method of bit stream interleaving for a MIMO system that implements the IEEE 802.11n standard. The interleaving method increases the column rotation to the largest possible distance within a block to fully explore the diversity of the wireless system.

Figure 1:
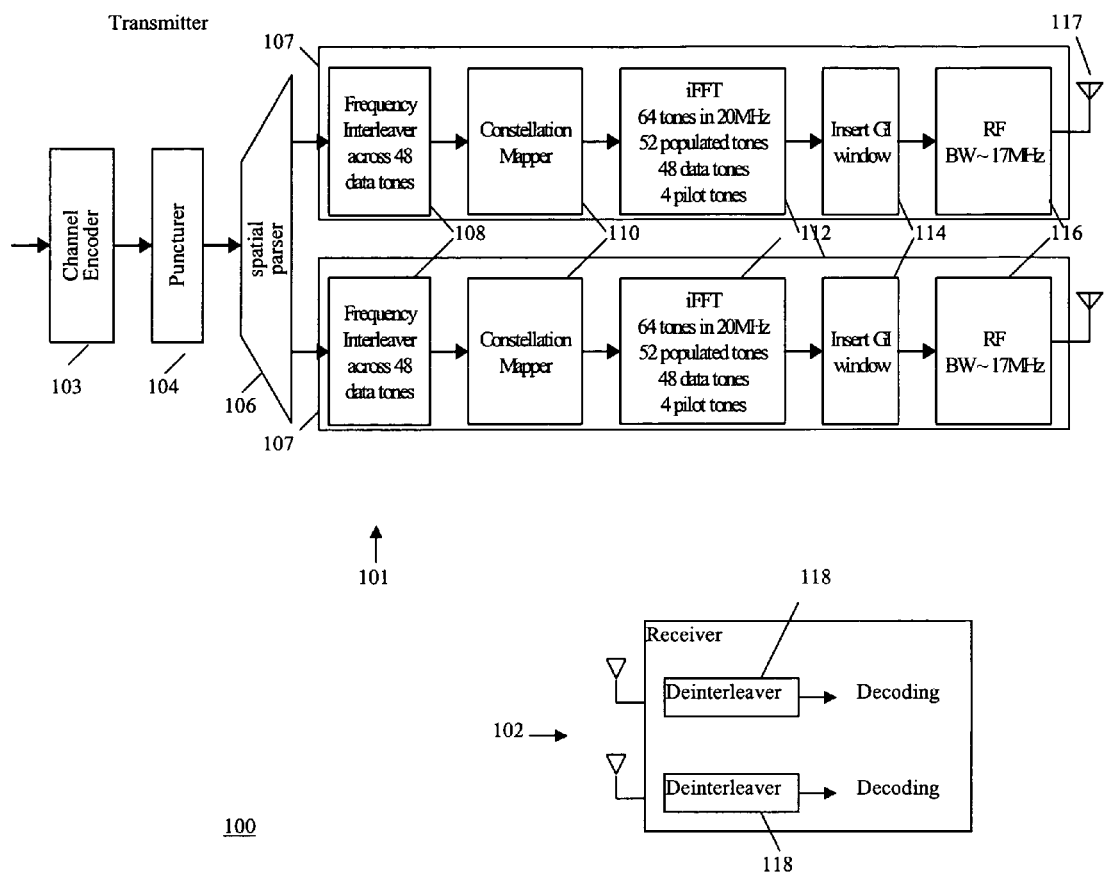
FIG. 1 shows a functional block diagram of an embodiment of an OFDM MIMO transmitter according to the present invention.

FIG. 1 shows an example block diagram of an OFDM MIMO system 100 (e.g., 20 MHz channel) implementing WLAN 802.11n, according to an embodiment of the present invention. The system 100 includes a transmitter 101 and a receiver 102. The transmitter 101 comprises a channel encoder 103, a puncturer 104, a spatial parser 106, and two data stream processing paths 107. Each data stream processing path 107 comprises an interleaver (e.g., interleavers 108A, 108B) a constellation mapper 110, an IFFT function 112, and guard-band insertion window 114 and an RF modulator 116. For the parser 106 and the interleaver 108A/108B portions of the transmitter, coded and punctured bits are interleaved across spatial streams and frequency tones. There are two steps to the space-frequency interleaving: spatial stream parsing and frequency interleaving.

Conventionally, encoded and punctured bits are parsed to multiple spatial streams by a round-robin parser where $$s=\max\{N_{BPSC}/2,1\} \quad (1)$$

such that s is the number of bit parsed onto one antenna each round, and $N_{BPSC}$ is the number of coded bits per subcarrier. A conventional parser sends consecutive blocks of s bits to different spatial streams in a round-robin fashion starting with the first spatial stream. All encoded bits are conventionally interleaved by a separate block interleaver for each spatial stream, with a block size corresponding to the number of bits in a single OFDM symbol, $N_{CBPS}$. The conventional block interleavers are based on the 802.11a interleaver, with certain modifications to allow for multiple spatial streams and 40 MHz transmissions.

The basic interleaver array has $N_{row}$ rows and $N_{column}$ columns and $N_{BPSC}$ is the number of coded bits per subcarrier (e.g. $N_{BPSC}$=1 for BPSK, 2 for QPSK, 4 for 16 QAM, etc), wherein the interleaver parameters are shown in Table 1 below.

TABLE 1

| Interleaver Parameters | | |
|---|---|---|
| | $N_{column}$ | $N_{row}$ |
| 20 MHz channels | 16 | 3 $N_{BPSC}$ |
| 40 MHz channels | 18 | 6 $N_{BPSC}$ |

A conventional interleaver is defined by a two-step permutation. The first-step permutation (first permutation) ensures that adjacent coded bits are mapped onto nonadjacent subcarriers. The first permutation is modified from the 802.11a interleaver such that the column indexes in the array are rotated by one column for each spatial stream. The second-step permutation (second permutation) ensures that coded bits are mapped alternately onto less and more significant bits of the constellation and thereby long runs of low reliability (LSB) bits are avoided.

Relations (2) and (3) below define a conventional interleaver, wherein the index of the coded bit before the first permutation is denoted by k, and i is the index after the first and before the second permutation. In the conventional interleaver, the first permutation is defined by relation (2) below:

$$i=N_{row}\times(((k \bmod N_{column})+i_{SS}) \bmod N_{column})+\text{floor}(k/N_{column}), \quad (2)$$

$$k=0,1,\ldots,N_{CBPS}-1,$$

where $i_{ss}$=0,1, . . . , $N_{SS}$−1, is the index of the spatial stream on which this interleaver is operating. The insertion of $i_{SS}$ is a modification of the 802.11a interleaver. This results in a "column offset" in the de-interleaving process. That is, bits are read in by rows and out by columns, but starting with column $i_{SS}$ in a column-cyclic fashion.

Further, conventionally the second permutation is defined by relation (3) below, wherein j is the index after the second permutation, just prior to modulation mapping:

$$j=s\times\text{floor}(i/s)+(i+N_{CBPS}-\text{floor}(N_{column}\times i/N_{CBPS})) \bmod s, \quad (3)$$

$$i=0,1,\ldots,N_{CBPS}-1,$$

where s is determined according to relation (4) below:

$$s=\max(N_{BPSC}/2,1). \quad (4)$$

Similarly, deinterleaver in a receiver performs the inverse relation, and is defined by a first-step permutation and a second-step permutation corresponding to the conventional interleaver permutations above. Relations (5) and (6) define these first and second permutations for a conventional deinterleaver, wherein the index of the original received bit before the first permutation shall is denoted by j, and i is the index after the first and before the second permutation.

Conventionally, the first permutation in the deinterleaver is defined by relation (5) below:

$$i=s\times\text{floor}(j/s)+(j+\text{floor}(N_{column}\times j/N_{CBPS})) \bmod s, \quad (5)$$

$$j=0,1,\ldots,N_{CBPS}-1,$$

where s is as defined in relation (4) above. The first permutation in relation (5) is the inverse of the first permutation in relation (3) above.

Conventionally, the second permutation in the deinterleaver is defined by relation (6) below, where k is the index after the second permutation:

$$k=N_{column}(i \bmod N_{row})+(\text{floor}(i/N_{row})-i_{ss}+N_{column}) \bmod N_{column},$$

$$i=0,1,\ldots,N_{CBPS}-1.$$

(6)

The second permutation in relation (6) is the inverse of the interleaver permutation in relation (2) above.

As noted, the conventional system provides write in block, column rotation for multiple antennas transmission, and PAM order rotation within a column. However, because the columns are rotated by only one column, adjacent bits only e.g. 3 and 6 sub-carriers apart for 20 MHz and 40 MHz systems. As a result, in a correlated channel, the diversity gain is not fully utilized.

Improved Interleaver/Deinterleaver

In one embodiment, the present invention provides an interleaving process in the interleavers 108A/108B (FIG. 1) that increases the column rotation to the largest possible distance within a block to fully explore the diversity of the wireless system. Example simulations have shown e.g. 0.5~1 dB gain over a conventional interleaver.

In the example interleavers 108A/108B according to the present invention, in the first permutation, the column rotation is changed from one column rotation to $((N_{column}/N_{ss}) \times i_{ss})$ column rotations, where $N_{ss}$ is the total number of spatial data streams and $i_{ss}$ is index of spatial data stream which ranges from e.g. 0 to $N_{ss}-1$. As such, in contrast to the conventional interleaving relation (2) above, the first permutation in the interleavers 108A/108B according to the present invention is defined by relation (7) below:

$$i=N_{row}\times(((k \bmod N_{column})+\text{floor}(N_{column}/N_{ss})\times i_{SS}) \bmod N_{column})+\text{floor}(k/N_{column})$$

where $k=0,1,\ldots,N_{CBPS}-1$. (7)

On the receiver side, the receiver 102 performs the reverse operation and includes de-interleavers 118 for de-interleaving the received bits. In contrast to the conventional deinterleaving relation (6) above, the second permutation in the deinterleaver 118 according to the present invention is defined by relation (8) below:

$$k=N_{column}\times(i \bmod N_{row})+(\text{floor}(i/N_{row})-\text{floor}(N_{column}/N_{ss})\times i_{ss}+N_{column}) \bmod N_{column}$$

wherein $i=0,1,\ldots,N_{CBPS}-1$. (8)

For example, if two data streams are to be transmitted, using interleavers 108A/108B according to the present invention, the adjacent data bits are separated 8 columns apart for different data streams in a 20 MHz channel. In another example, the adjacent data bits are separated 9 columns apart for different data streams in a 40 MHz channel.

In one example transmitter where there are multiple spatial streams, a block of bits in first data stream is transmitted without any rotation in that block. Conventionally, each remaining spatial stream is transmitted after $i_{ss}$ column rotation relative to the first spatial stream. However using interleavers according to the present invention (e.g., interleavers 108A/108B), each remaining spatial stream is transmitted after multiple column rotations, wherein the number of rotations is the number of columns in the interleaver array divided by the number of spatial streams.

In another example transmitter where there are two spatial streams, and one spatial stream is transmitted over a first antenna, and the other over a second antenna, a first block of bits is transmitted over the first antenna without any rotation in that block. Conventionally, for the second antenna, data is transmitted with one column rotation where the second column is rotated to the first column, and so one, so that all the columns are shifted/rotated left by one column. Using interleavers according to the present invention (e.g., interleavers 108A/108B) however, for the second antenna, the number of rotations is the number of columns in the interleaver array divided by the number of antennas. For example, for a 20 MHz transmitter having two antennas, the interleaver array comprises 16 columns and three rows of bits. According to the present invention, for the second antenna, the number of rotations is the number of columns (16) divided by the number of antennas (2), resulting in 8 column rotations. As such, columns 9 through 16 are shifted into the first part (first 8 columns) of the array block, and columns 1 through 8 are shifted into the second part (second 8 columns) of the array block for transmission.

The MIMO system performance (e.g., throughput) using multiple column rotation interleaving according to the present invention is improved in comparison to a conventional system with one column rotation interleaving. This is because in OFDM different subcarriers are used and when bits are rotated by multiple columns, adjacent bits are separated further in the spatial domain and in the subcarrier space, reducing fading in transmission channels.

In the example system 100, using multiple column rotation interleaving in the transmitter 101, two adjacent bits have less probability of seeing the same channel. As such, in the receiver 102 when the received data bits are de-interleaved for convolution decoding, if one received bit has low energy (bad bit) because of transmission in a fading channel, and an adjacent bit has high energy (good bit), the good bit can be used to recover the bad bit by convolution decoding.

With the conventional one column rotation interleaving, the adjacent data bits are spatially close and can face the same bad transmission channel. In a case where there are several continuous bits that face the same bad channel, it is difficult for the receiver to recover the bits by convolution decoding. However, with multiple column rotation interleaving according to the present invention, adjacent bits are spatially separated such that they are less likely to be transmitted in the same bad/fading channel. As such, if a bit is transmitted in a bad channel, and the adjacent bits are transmitted via good channels, decoding in the receiver can still recover the bit transmitted via the bad channel using the bits transmitted in the good channels.

Figure 2:
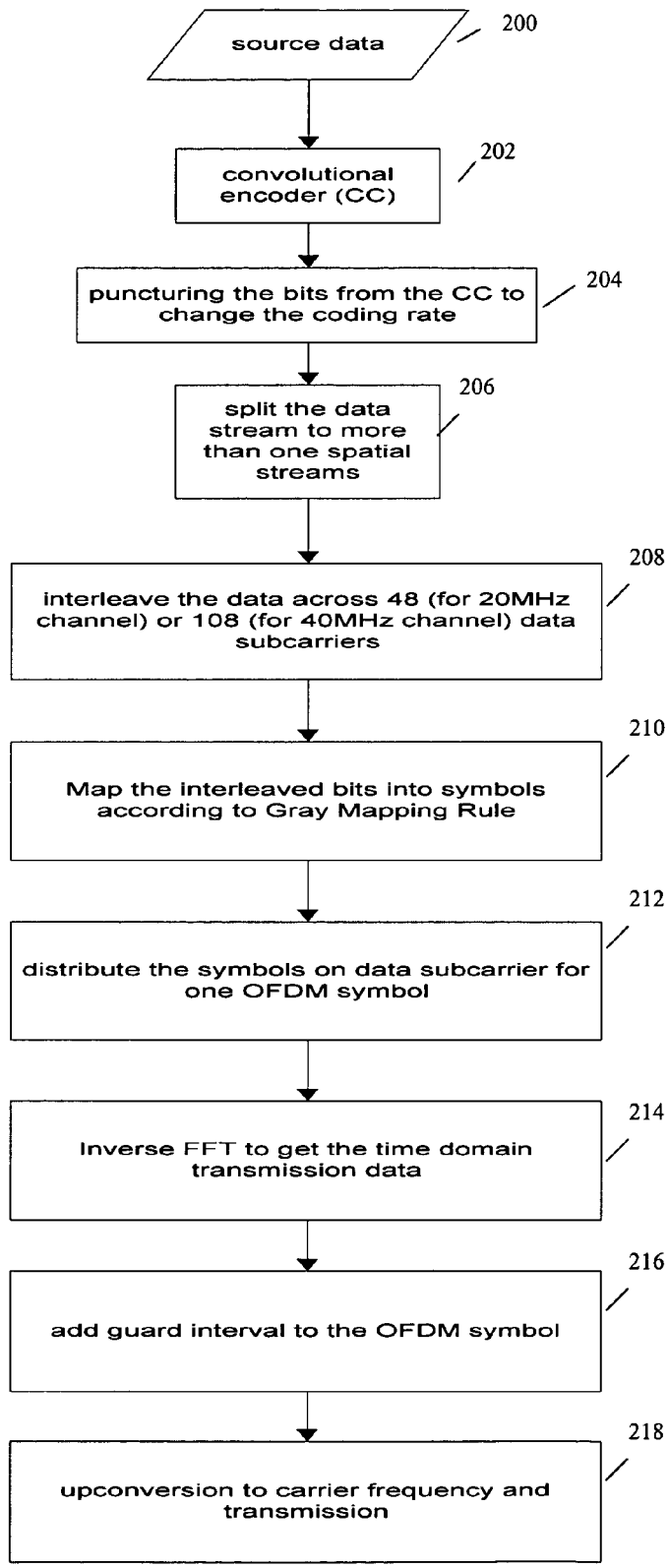
FIG. 2 shows a flowchart of the steps of operating of the transmitter of FIG. 1.

In one example, the transmitter 101 of FIG. 1 operates according to the steps of the flowchart in FIG. 2, wherein: source bit stream is received (step 200); the channel encoder encodes 103 data using convolutional encoding (CC) (step 202); the puncturer 104 punctures the bits from the CC to change the coding rate (step 204); the spatial parser 106 separates the data stream into several spatial streams (step 206 an interleaver (e.g., 108A/108B) for each spatial stream processing path 107 interleaves the bits using multiple column rotations (for different spatial streams different column rotations are used) (step 208); the constellation mapper 110 groups/maps the interleaved bits into symbols using a Gray Mapping Rule (e.g., BPSK groups 1 bit into one symbol; 64 QAM groups 6 bits into one symbol, etc.) (step 210); the symbols are distributed on data subcarrier of one OFDM symbol by an IFFT operation wherein the data symbols are mapped onto each subcarrier for IFFT (step 212); the IFFT function 112 converts the frequency domain data to time domain transmission data (step 214); the guard window 114 adds guard interval to each OFDM symbol in time domain, to prevent inter symbol interference (step 216); and in the RF modulator 116 the signal is RF modulated and transmitted through the strongest channel via antennas 117 (step 218).

Figure 3:
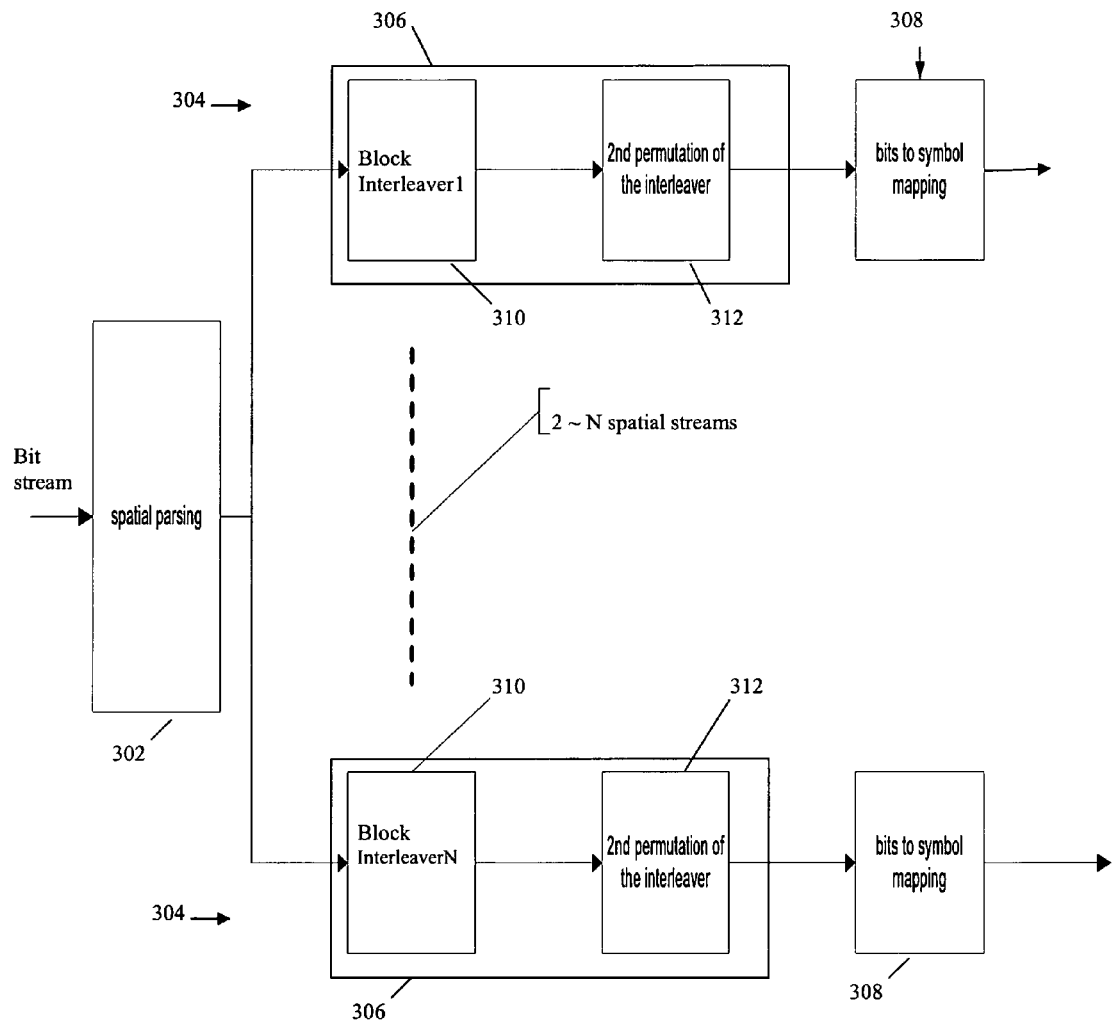
FIG. 3 shows a functional block diagram of example interleavers according to another embodiment of the present invention.

FIG. 3 shows a more detailed block diagram of a transmitter 300 utilizing an interleaving process for multiple spatial stream paths, according to another embodiment of the present invention. The transmitter 300 includes a spatial parser 302, and multiple spatial stream processing paths 304. Each path 304 includes an interleaver 306 and a bit to symbol mapper 308. Each interleaver comprises a block (first permutation) interleaver 310, Block Interleaver1 and Block Interleaver2, respectively, and a second permutation interleaver 312. The Block Interleaver1 and Block Interleaver2 are implemented differently by different column rotation.

After spatial parsing of the input bit stream into multiple spatial streams by the parser 302, each spatial stream is processed in a corresponding spatial stream path processing path 304. Then, the bits processed in each spatial stream path 304 are transmitted via a channel (e.g., as in system 100 of FIG. 1).

As noted, the example of FIG. 3, the interleaver 308 in each spatial stream path comprises a block (first permutation) interleaver 310 and a second permutation interleaver 312. The block interleavers 310 are configured according to the present invention (e.g., relation (7) above), such that each spatial stream is transmitted after multiple column rotations, wherein the number of column rotations is the number of columns in the interleaver array divided by the number of spatial streams (described above). The column rotation for each spatial stream is different from other spatial streams.

Figure 4:
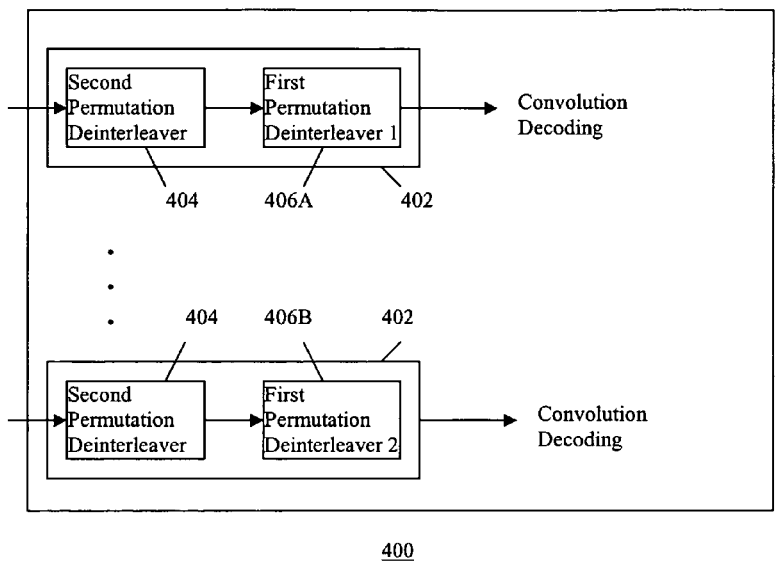
FIG. 4 shows a functional block diagram of an embodiment of an OFDM MIMO receiver including deinterleavers according to the present invention.

Referring to FIG. 4, a receiver 400 performs the reverse operation, wherein the receiver 400 includes a de-interleaver 402 for each spatial stream for de-interleaving the received bits of each spatial stream according to the present invention. Each deinterleaver 402 comprises a second permutation deinterleaver 404 implementing relation (5) above and first permutation deinterleaver 406A/406B (e.g., implementing relation (8) above).

Improved Parser

To further explore the diversity in the OFDM MIMO system 100 of FIG. 1, the spatial parser 106 further implements bitwise round robin parsing according to the present invention, in contrast to the conventional group bits round robin parsing. Conventionally, 1, 2 and 3 continuous bits are parsed onto the same data stream to keep the PAM order for BPSK, QPSK, 16 QAM and 64 QAM modulation. However, according to an embodiment of the present invention, the parser 106 parses one bit to one data stream each time. In one example, the parser 106 parses a bit stream into two spatial data streams, wherein all the odd indexed bits are parsed onto one spatial data stream while all even indexed bits are parsed to another spatial data stream to increase spatial diversity. For example in 64 QAM there are 6-bits per symbols. In a conventional system with two transmitter antennas, a group parser separates the bits such that bits 1, 2, 3 are transmitted via the first antenna, and bits 4, 5, 6 go into the second antenna. According to the present invention however, the parser 106 places the odd indexed bits 1, 3, 5 into the first antenna 117 and the even indexed bits 2, 4, 6 into the second antenna 117, thereby increasing spatial diversity.

For BPSK and QPSK modulation, both the conventional parser and a parser according to the present invention perform the same function. Group parsing performs parsing with a group of s bits where s is defined in relation (1). For BPSk and QPSK, s=1. So it is equivalent to bitwise parsing. However, for 16 QAM and 64 QAM modulation, the conventional parser and a parser according to the present invention parse the data in different ways.

Puncturer Placement

Figure 5:
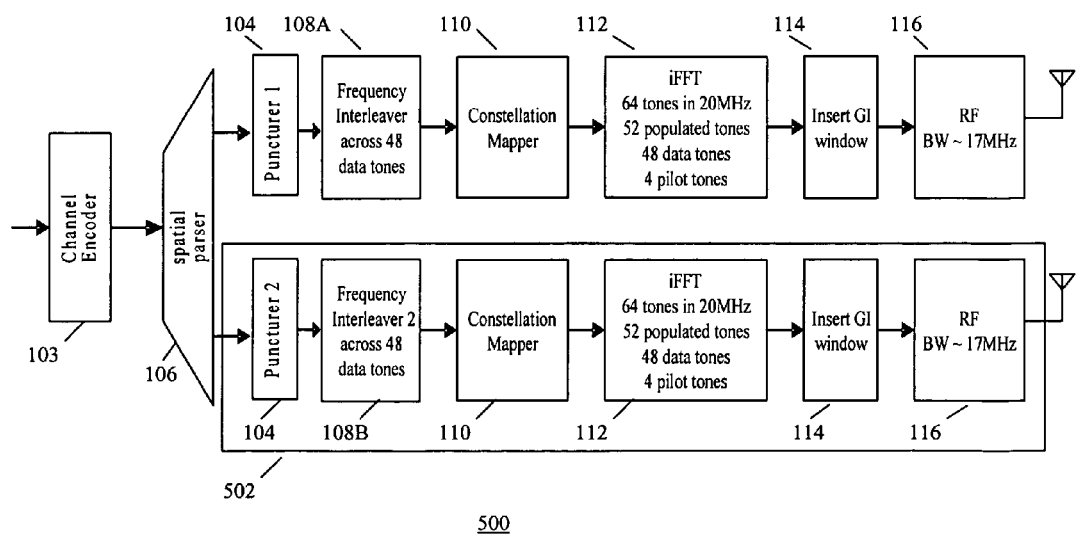
FIG. 5 shows a functional block diagram of an embodiment of an OFDM MIMO transmitter according to another embodiment of the present invention.

In another aspect the present invention provides a transmitter which performs a puncturing process after the parsing process. For example, FIG. 5 shows a functional block diagram of an embodiment of an OFDM MIMO transmitter 100 according to the present invention wherein the puncturing process is performed after the parsing process. The example transmitter 500 of FIG. 5 is a variation of the example transmitter 101 of FIG. 1.

The transmitter 500 includes a channel encoder 103, a spatial parser 106, and two data stream processing paths 502. Each data stream processing path 502 includes a puncturer 104, an interleaver (e.g., interleavers 108A and 108B), a constellation mapper 110, an IFFT function 112, and guard-interval insertion window 114 and an RF modulator 116. For the parser 106 and the interleaver 108A/108B portions of the transmitter, coded and punctured bits are interleaved across spatial streams and frequency tones.

As shown, in the transmitter 500, each spatial data stream path includes a puncturer 104, allowing different transmission rates for the two spatial streams (based on the channel conditions). In one example, one puncturer 104 provides a convolutional code 1/2 for a first data stream, and the other puncture 104 provides a convolution code 3/4 for the second data stream. Using multiple puncturers 104 provides more flexibility. For example, where there are two transmitter antennas, if the first antenna provides a better channel than the second antenna, then on the first antenna a high transmission data rate can be achieved, and on the second antenna somewhat lower data transmission rate is achieved. This combination, makes a MIMO OFDM system according to the present invention more flexible and essentially allows optimization of the transmission.

Simulation Results

Simulations have been conducted by the inventors to verify the performance improvement provided by the improved interleaver and parser according to the present invention. The following simulation results are for both 40 MHz and 20 MHz channels. The coding and modulation modes under simulation are listed in Table 2.

TABLE 2

MCS definition in simulation

| Bits 18-23 in HT-SIG1 (MCS index) | Number of spatial streams | Modulation | Coding rate | GI = 800 ns | |
|---|---|---|---|---|---|
| | | | | Rate in 20 MHz | Rate in 40 MHz |
| 9 | 2 | QPSK | 1/2 | 24 | 54 |
| 11 | 2 | 16-QAM | 1/2 | 48 | 108 |
| 12 | 2 | 16-QAM | 3/4 | 72 | 162 |
| 13 | 2 | 64-QAM | 2/3 | 96 | 216 |
| 14 | 2 | 64-QAM | 3/4 | 108 | 243 |

IEEE 802.11n channel models BLOS, DLOS, ELOS and DNLOS have been used for simulation. Perfect synchronization and no RF impairment were assumed. For the 40 MHz simulation, perfect channel estimation is assumed while for 20 MHz simulation, tone by tone channel estimation is used. An MMSE detector was used for data stream separation. The simulation results showed that an example interleaver according to the present invention performs 0.5 to 1 dB gain over the conventional interleaver. Based on the simulation result, performance gain is achieved from the larger column rotation distance compared with the conventional interleaver.

Figure 6:
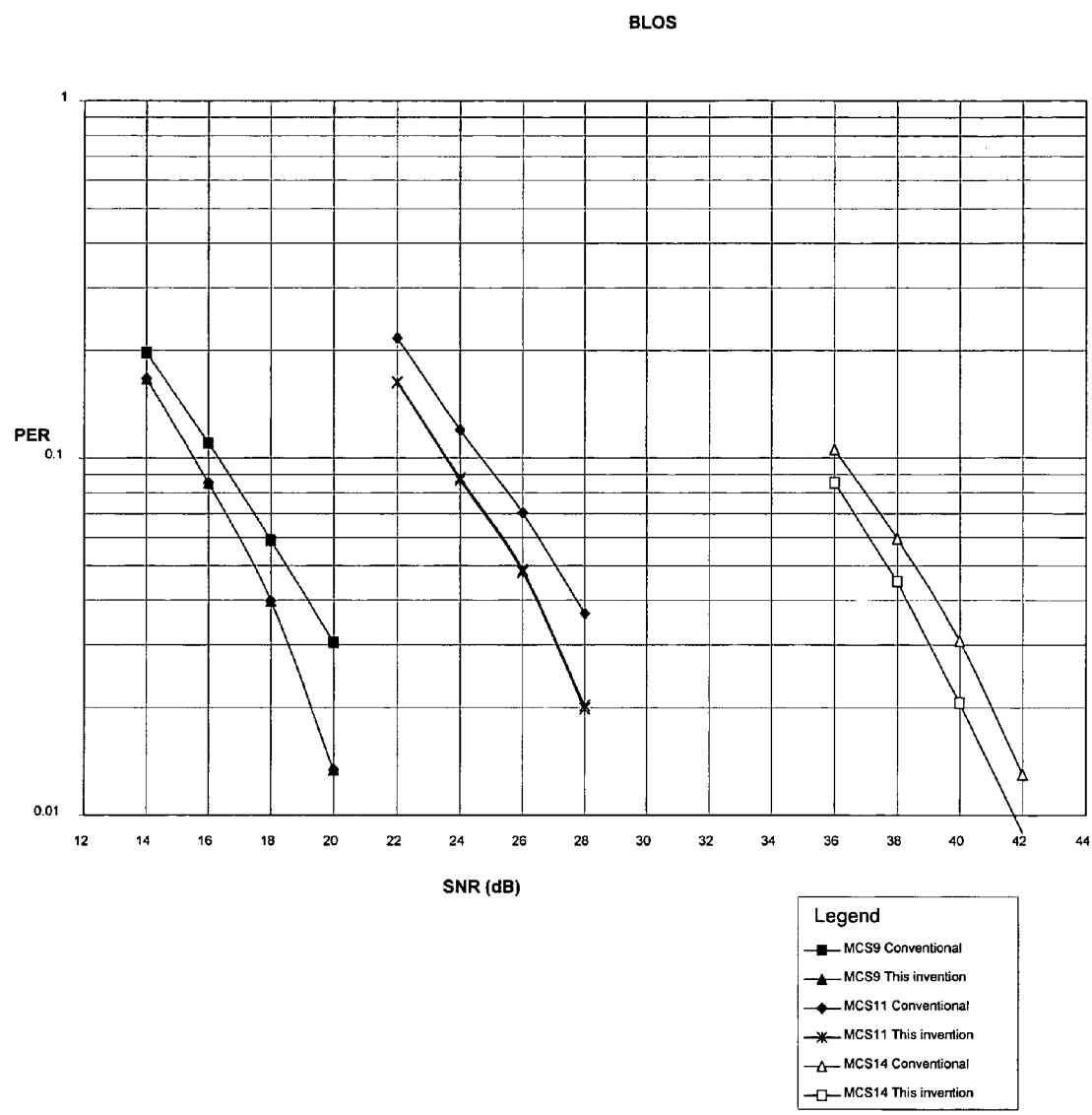
FIG. 6 shows an example simulation result illustrating the performance difference using a conventional interleaver and an interleaver according to an embodiment of the present invention.

Some of the simulation results are shown by example in FIG. 6, to show the performance improvement according to embodiments of the present invention compared to conventional methods. FIG. 6 shows example simulation results illustrating system performance difference using a conventional interleaver (results designated as "Conventional" in FIG. 6) and an interleaver according to an embodiment of the present invention (results designated as "This Invention" in FIG. 6), for a 40 MHz BLOS channel. FIG. 6 shows examples for three different Modulation and Coding Set (MCS) modes MCS9, MCS11 and MCS14 (corresponding to different modulation constellation and coding rates), wherein the performance according to the present invention is about 0.5-1 dB gain (left shift of 0.5-1 dB) compared to the conventional curves on the signal-to-noise-ratio (SNR) vs. packet error rate (PER) scale in FIG. 6.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of data communication in a wireless system, comprising the steps of:
   parsing a bit stream into multiple spatial data streams;
   interleaving the bits in each spatial data stream by performing multiple column rotation to increase diversity of the wireless system; and
   transmitting the bits of each spatial data stream,
   wherein the number of column rotations for each spatial data stream is a function of the number of the total spatial data streams,
   wherein the number of column rotations for each spatial data stream is a function of the number of the total spatial data streams and the number of columns in the interleaver array, and each spatial data stream interleaver array includes $N_{row}$ rows and $N_{column}$ columns of bits, such that the number of column rotations for each spatial data stream is $((N_{column}/N_{ss}) \times i_{ss})$ column rotations, where $N_{ss}$ is the number of spatial data streams and $i_{ss}$ is index of spatial data stream.

2. The method of claim 1 wherein the steps of interleaving the bits in each spatial data stream further includes the steps of performing multiple column rotation to the largest possible distance within an interleaving array of that spatial data stream, to increase diversity of the wireless system.

3. The method of claim 1 wherein the steps of interleaving the bits in each spatial data stream includes the steps of performing a first interleaving permutation to ensure that adjacent coded bits are mapped onto nonadjacent subcarriers for transmission, and a second interleaving permutation, such that the first interleaving permutation includes interleaving the bits in each spatial data stream by performing multiple column rotation to increase diversity of the wireless system.

4. The method of claim 3 wherein the first interleaving permutation further includes the steps of determining the index i of a coded bit after the first permutation, and before the second permutation, according to the relation:

$$i=N_{row} \times (((k \bmod N_{column}) + \text{floor}(N_{column}/N_{ss}) \times i_{SS}) \bmod N_{column}) + \text{floor}(k/N_{column}),$$

where k=0,1, ..., $N_{CBPS}-1$, is the index of the coded bit before the first permutation, and $N_{BPSC}$ is the number of coded bits per subcarrier.

5. The method of claim 3 further including the steps of receiving the transmitted bits of each spatial bit stream, and deinterleaving the received bits to determine the index k of the coded bit after a second deinterleaving permutation:

$$k=N_{column} \times (i \bmod N_{row}) + (\text{floor}(i/N_{row}) - \text{floor}(N_{column}/N_{ss}) \times i_{ss} + N_{column}) \bmod N_{column},$$

wherein i=0,1, ..., $N_{CBPS}-1$, i is index of a coded bit after the first deinterleaving permutation, and before the second deinterleaving permutation.

6. The method of claim 1 wherein the wireless system comprises a MIMO system.

7. The method of claim 6 wherein the wireless system comprises an OFDM MIMO system.

8. The method of claim 1 wherein the steps of parsing the bit stream further includes the steps of bitwise round robin parsing to increase spatial diversity.

9. The method of claim 8 wherein the steps of parsing the bit stream further includes the steps of bitwise round robin parsing such that one bit of the bit stream is parsed to one data stream each time.

10. The method of claim 1 further including the steps of puncturing each spatial data stream after the step of parsing.

11. The method of claim 10 wherein the step of puncturing for each spatial data stream is based on the channel condition.

12. A wireless communication system, comprising:
    a transmitter including:
      a parser that parses a bit stream into multiple spatial data streams;
      multiple interleavers corresponding to the multiple spatial data streams, wherein each interleaver interleaves the bits in the corresponding spatial data stream by performing multiple column rotation to increase diversity of the wireless system; and
      a modulator that transmits the bits of each spatial data stream; and
    a receiver that receives and deinterleaves the transmitted bits, wherein the number of column rotations for each spatial data stream is a function of the number of the spatial data streams,
    wherein the number of column rotations for each spatial data stream is a function of the number of the spatial data streams and the number of bit columns in the interleaver array, and each spatial data stream interleaver array includes $N_{row}$ rows and $N_{column}$ columns of bits, such that the number of column rotations for each spatial data stream is $((N_{column}/N_{ss}) \times i_{ss})$ column rotations, where $N_{ss}$ is the number of spatial data streams and $i_{ss}$ is index of spatial data stream.

13. The system of claim 12 wherein each interleaver performs multiple column rotation to the largest possible distance within an interleaving array of the corresponding spatial data stream, to increase diversity of the wireless system.

14. The system of claim 12 wherein each interleaver includes a first permutation interleaver that ensures that adjacent coded bits are mapped onto nonadjacent subcarriers for transmission, and a second permutation interleaver, such that the first permutation interleaver interleaves the bits in the corresponding spatial data stream by performing multiple column rotation to increase diversity of the wireless system.

15. The system of claim 14 wherein the first permutation interleaver further determines the index i of a coded bit after the first permutation, and before the second permutation, according to the relation:

$$i=N_{row} \times (((k \bmod N_{column}) + \text{floor}(N_{column}/N_{ss}) \times i_{SS}) \bmod N_{column}) + \text{floor}(k/N_{column}),$$

where k=0,1, ..., $N_{CBPS}-1$, is the index of the coded bit before the first permutation, and $N_{BPSC}$ is the number of coded bits per subcarrier.

16. The system of claim 14 wherein the receiver includes a plurality of deinterleavers such that each deinterleaver deinterleaves the bits in a received spatial data stream.

17. The system of claim 16 wherein each deinterleaver includes a first permutation deinterleaver and a second permutation deinterleaver, and the first permutation deinterleaves deinterleaves the received bits determine the index k of the coded bit after a second deinterleaving permutation according to the relation:

$$k = N_{column} \times (i \bmod N_{row}) + (\text{floor}(i/N_{row}) - \text{floor}(N_{column}/N_{ss}) \times i_{ss} + N_{column}) \bmod N_{column},$$

wherein i=0,1, ..., $N_{CBPS}-1$, is index of a coded bit after the first deinterleaving permutation, and before the second deinterleaving permutation.

18. The system of claim 12 wherein the wireless system comprises a MIMO system.

19. The system of claim 18 wherein the wireless system comprises an OFDM MIMO system.

20. The system of claim 12 wherein the parser parses the bit stream by bitwise round robin parsing, to increase spatial diversity.

21. The system of claim 20 wherein the parser parses the bit stream by bitwise round robin parsing such that one bit of the bit stream is parsed to one data stream each time.

22. The system of claim 12 further including a puncturer for each spatial data stream after the parser.

23. The system of claim 22 wherein puncturing in each puncturer for each spatial data stream is based on the channel condition.

24. The method of claim 1, wherein the interleaving the bits in each spatial data stream comprises multiple column rotation of data bits.

25. The system of claim 12, wherein each interleaver interleaves data bits in the corresponding spatial data stream by performing multiple column rotation of the data bits.

* * * * *